W. K. LEGGETT.
WATER CIRCULATION SYSTEM FOR EXPLOSION ENGINES.
APPLICATION FILED NOV. 24, 1914.
1,177,042.  Patented Mar. 28, 1916.
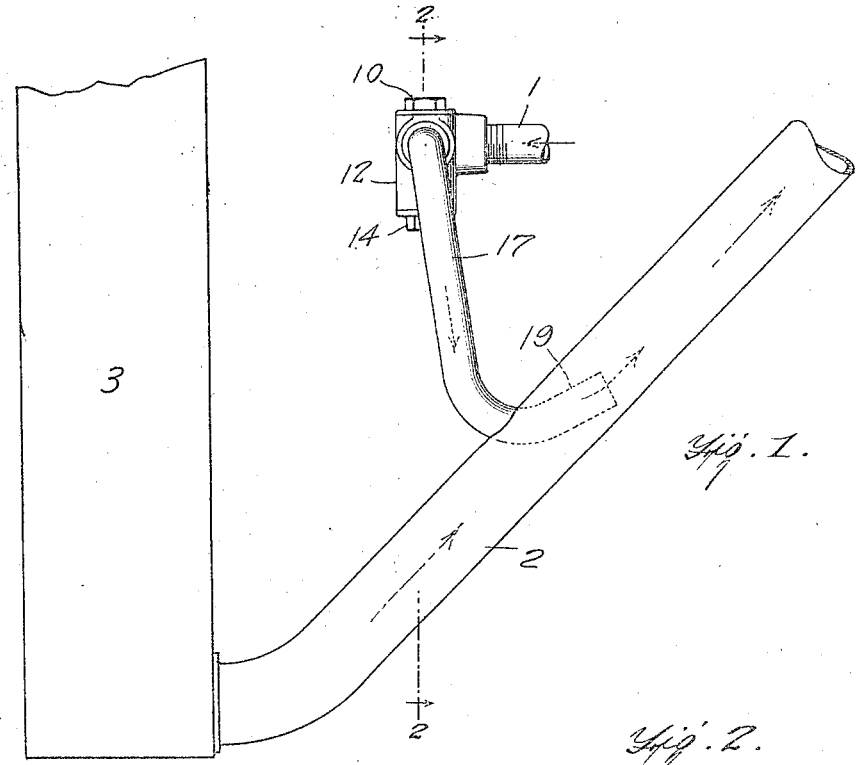
Fig. 1.
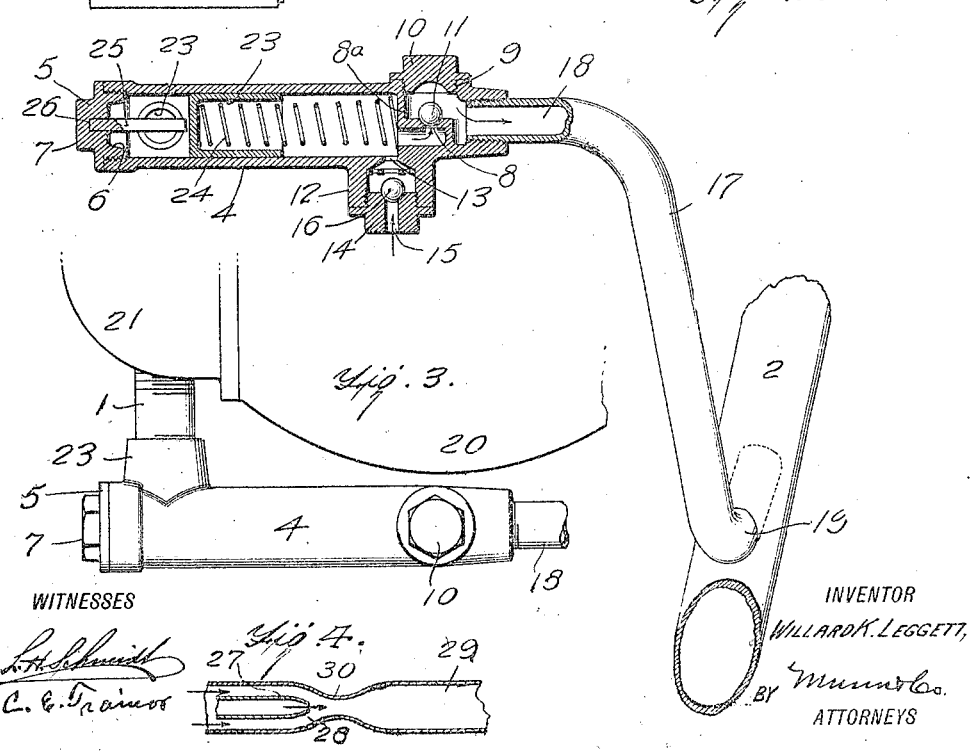
Fig. 2.
Fig. 3.
Fig. 4.
WITNESSES
INVENTOR
WILLARD K. LEGGETT,
BY Munn & Co.
ATTORNEYS

UNITED STATES PATENT OFFICE.

WILLARD K. LEGGETT, OF JACKSON, MICHIGAN, ASSIGNOR OF ONE-THIRD TO EUGENE PHILLIPS AND ONE-THIRD TO JAMES A. PHILLIPS, BOTH OF JACKSON, MICHIGAN.

WATER-CIRCULATION SYSTEM FOR EXPLOSION-ENGINES.

1,177,042.  Specification of Letters Patent.  Patented Mar. 28, 1916.

Application filed November 24, 1914. Serial No. 873,772.

*To all whom it may concern:*

Be it known that I, WILLARD K. LEGGETT, a citizen of the United States, and a resident of Jackson, in the county of Jackson and State of Michigan, have invented a new and useful Improvement in Water-Circulation Systems for Explosion-Engines, of which the following is a specification.

My invention is an improvement in water circulation systems for explosion engines, and has for its object to provide an attachment of the character specified, designed to be interposed between the exhaust of the engine, and the water line of the radiator for utilizing the impulses of the exhaust to supply cold air to the radiator or engine for cooling the same, and aiding the circulation of the water.

In the drawings: Figure 1 is an end view of the attachment in place, Fig. 2 is a section on the line 2—2 of Fig. 1, looking in the direction of the arrows adjacent to the line, Fig. 3 is a top plan view of the attachment, and Fig. 4 is a sectional view showing the arrangement of connection between the attachment and the water line.

The present embodiment of the invention is shown in connection with the exhaust pipe 1 of an explosion engine, the attachment being arranged between the said pipe and the water line 2 of the radiator 3. The attachment comprises a cylinder 4, having at one end a head 5, the said head having a reduced portion 6 externally threaded and engaged with the open end of the cylinder. The said head has a polygonal extension 7 for engagement by a wrench or the like to permit the head to be removed or replaced. The opposite end of the cylinder is open and internally threaded for a purpose to be presently described, and near the closed end a diaphragm 8$^a$ is arranged transversely of the cylinder, the said diaphragm having a horizontal portion provided with a port 8.

The cylinder is provided with an internally threaded opening 9 just above the port and normally closed by a plug 10. A ball valve 11 rests upon the seat and normally closes the port, the valve being in fact a check valve for permitting air to escape from the cylinder through the port and to prevent the return of the air. The cylinder is provided with a depending nipple 12 at the closed end, and a port 13 is provided between the nipple and the interior of the cylinder.

A plug 14 is threaded into the nipple, the plug having a central opening or port 15, and a ball valve 16 normally closes the port. It will be noted from an inspection of Fig. 2 that a seat is provided at each port 8 and 15, in which the ball valve 11 or 16 rests when the valve is closed, and the said valves are check valves, controlling the outlet and the inlet, respectively, of the cylinder. Access may be had to the valve 11 by removing the plug 10, and access may be had to the valve 16 or to the port 15, by removing the plug. Each plug is polygonal at its outer end for engagement by a wrench or the like to permit the removal of the plug.

A pipe 17 is provided for connecting the cylinder with the water line 1 of the radiator, and the said pipe is provided at each end with an angular portion 18 and 19, respectively. The angular portion 18 of the pipe 17 is externally threaded and is engaged with the open end of the cylinder. The opposite end 19 of the pipe passes through an opening in the water line 2, the arrangement being such that a current of air flowing through the pipe 17 from the cylinder will enter the water line at an acute angle to the direction of flow of the water through the water line.

Referring to Fig. 1 the arrows indicate the course of the water in the water line and the course of air in the pipe 17, and it will be noted from an inspection of these arrows that the pipe 17 connects with the pipe which carries the water away from the radiator. The cylinder of the engine is indicated at 20, and the exhaust manifold at 21, and the pipe 1 leads from the exhaust manifold to the cylinder, engaging within an internally threaded nipple 22 at the end adjacent to the head 5.

A piston 23 is arranged within the cylinder, the piston being cup-shaped and having the end adjacent to the head 5 closed, and the opposite end being open. A coil spring 24 is arranged between the closed end of the piston and the diaphragm 8$^a$, the spring acting normally to force the piston toward the head 5. In order however, to prevent the piston covering the inlet of the nipple 22, a stop 25 is provided for limiting the movement of the piston toward the port 23. This stop is in the form of a rod having one end received within a socket 26 in the head 5, and the other end extends slightly beyond the inlet of the port 23. The stop is coaxial with the cylinder, and it will be evident that when the piston engages the stop it will be checked in its movement toward the nipple 23 to a position such that this nipple is always uncovered.

In operation every exhaust impulse will be transmitted to the interior of the cylinder through the nipple 23, and the said impulses will drive the piston toward the diaphragm 8ª. Each exhaust impulse will thus move the piston toward the diaphragm 8ª a greater or less distance depending upon the force of the impulse, and the spring 24 will move the piston in the opposite direction, returning the piston into contact with the stop 25 every time that the piston is moved toward the diaphragm 8ª.

Whenever the piston moves toward the head 5, under the impulse of the spring, air will be drawn into the interior of the cylinder through the ports 13 and 14, the valve 16 being lifted to permit the inflow of the air. When the piston is moved in the opposite direction by the exhaust impulses, the air already in the cylinder will be forced out through the port 8 past the valve 11 and to the pipe 17 into the water line 2 of the radiator. The air cannot pass outwardly through the port 14 because of the check valve 16, and hence it must pass through the port 8. Thus during the running of the engine a current of air is continuously forced into the water line of the radiator.

It will be understood that the attachment is arranged in accordance with the type of engine used. For instance the piston will be arranged between the front of the engine and the radiator fan when a radiator fan is used, and the cylinder will be connected to the exhaust manifold opposite the opening for the No. 1 cylinder.

The fundamental purpose of the attachment is not to supply cold air to either the radiator or engine, but by means of that air acting with the injector to enforce the circulation of water through the system. The cooling of the water with the air is incidental.

It is obvious also that the pipe 17 might be arranged in the water line conducting the water to the radiator. The air in the water will pass up through the water to the top of the radiator, and will pass out at the top instead of through the over-flow of the radiator. In any event the attachment will assist in the circulation of the water, and will also exert a considerable cooling action of itself. Preferably the arrangement is as shown in Fig. 4, wherein the outlet 27 of the pipe leading from the cylinder to the water line is reduced at its outlet end as indicated at 28. The water line pipe 29 from the radiator to the engine is annularly reduced as indicated at 30 just beyond the reduced end of the pipe 27, and the pipe 27 is arranged coaxial with the pipe 29. The connection is thus an injector connection, so that the air passing from the cylinder will act to drive the water in the water pipe on its course.

It will be understood that the cylinder 4 may be provided with an exhaust port, if desired, so arranged that it will be uncovered at the end of the movement of the piston away from the inlet port for the exhaust. This however, in practice is not essential since the pumping action of the cylinder and piston is complete without the exhaust. The cylinder may be considered as having an air chamber at the end remote from the exhaust inlet, and the air chamber is provided with inlet and outlet ports, and with check valves for controlling the ports.

I claim:—

1. In an explosion engine having a water circulation cooling system, an air pump connected to the said system to inject air thereinto in the direction of flow of the cooling fluid, and comprising a cylinder having at one end check controlled inlet and outlet ports, and having at the other end a port adapted for connection with the exhaust of the engine, a piston in the cylinder and adapted to be moved toward the inlet and outlet ports by the exhaust impulses, a spring for returning the piston, and a delivery pipe connected with the cylinder on the outer side of the inlet port and delivering to the water circulation system in the direction of the flow of the fluid.

2. In an explosion engine having a water circulation cooling system, an air pump connected to the said system to inject air thereinto in the direction of flow of the cooling fluid, said pump comprising a cylinder having at one end an inlet port for connection with the exhaust of the engine, a connection between the opposite end of the cylinder and the water circulation system, said connection delivering in the direction of flow, the cylinder having inlet and outlet ports at the said last-named end, the outlet ports being between the connection with the circulation system and the cylinder, a piston in the cylinder adapted to be moved toward the ports by the exhaust impulses, a spring for returning the piston, and check valves at the inlet and the outlet ports of the cylinder.

3. In an explosion engine having a water circulation cooling system, an air pump connected to the said system to inject air thereinto, and having the inlet thereof discharging in the direction of flow of the cooling fluid, said pump comprising a cylinder having at one end an inlet port for connection with the exhaust of the engine, a piston in the cylinder and adapted to be moved by the exhaust impulses away from the inlet port, a spring for returning the piston, the opposite end being connected to the water circulation system, a check valve in the said connection, the cylinder having an inlet port at the said last-named end, and a check valve at the inlet port.

WILLARD K. LEGGETT.

Witnesses:
 LACERNE PATCH,
 EUGENE PHILLIPS.